Figure 1:
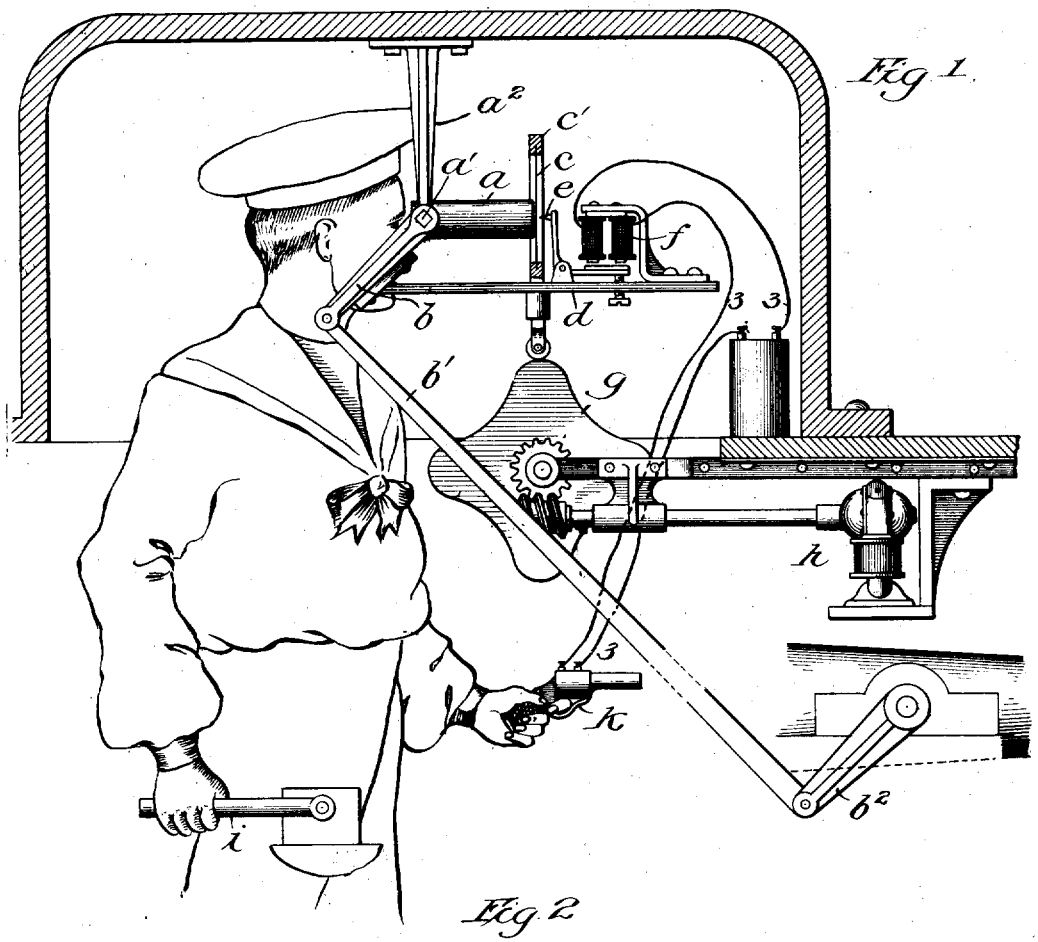

B. A. FISKE.

SIGHTING MACHINE.

APPLICATION FILED DEC. 29, 1908.

12,916. Reissued Feb. 9, 1909.

Witnesses:
Irving MacDonald
Ralph G. Johansen

Inventor:
Bradley A. Fiske.
By Barton Sanner & Folk
Att'ys.

UNITED STATES PATENT OFFICE.

BRADLEY A. FISKE, OF THE UNITED STATES NAVY, ASSIGNOR TO WESTERN ELECTRIC COMPANY, OF CHICAGO, ILLINOIS, A CORPORATION OF ILLINOIS.

SIGHTING-MACHINE.

No. 12,916. Specification of Reissued Letters Patent. Reissued Feb. 9, 1909.

Original No. 833,781, dated October 23, 1906, Serial No. 187,395. Application for reissue filed December 29, 1908. Serial No. 469,907.

*To all whom it may concern:*

Be it known that I, BRADLEY A. FISKE, a citizen of the United States, captain in the United States Navy, have invented a certain new and useful Improvement in Sighting-Machines, of which the following is a full, clear, concise, and exact description.

My invention relates to a sighting-machine; and its object is to provide a simple and convenient apparatus for use in connection with guns, such as those on warships, whereby practice may be had in sighting and aiming the guns at moving targets.

It has heretofore been customary to provide miniature targets which are suspended in front of the guns and moved up and down. A small gun is attached to the large gun, so that the bullet from it will strike the target at the point aimed at by the large gun. The gun-captains obtain practice in sighting and aiming the guns by aiming the large guns at the moving targets and then firing the small gun when the sight bears on the desired point, the bullet mark in the target indicating the accuracy of the aim.

In other devices, called "dotters," an electromagnetic marking device is arranged when actuated to make a dot on the target, and the gun-captain is provided with a firing-pistol, which closes the electric circuit by which said electromagnetic marking device is actuated. Devices of this kind are very valuable in instructing men to fire correctly and to follow a moving target; but they are large and inconvenient and require several men to work them A further objection is that they cannot well be used in windy weather. By employing my invention a gunner can practice sighting and firing by himself without requiring the assistance of others, and the use of the apparatus is not dependent upon the condition of the weather or the steadiness of the ship.

In accordance with my plan a sighting tube is arranged to be moved in the movement of the gun, and a target-picture is placed in close proximity to the front of the sighting-tube, this picture being independently movable. An electromagnetic marking device is arranged to mark the target at the point aimed at by the sighting-tube. I preferably employ a sighting-tube which has a lens at the eye-piece and cross-wires near its focus at the other end and arrange the target-picture to be movable in such close proximity to the cross-wires that there is no appreciable parallax between the cross-wires and the picture. This makes a very much more convenient arrangement than the telescope-sight of the gun and its miniature target, which must be several feet away from the telescope in order to be clearly seen. The target-picture is arranged to be moved up and down by suitable mechanism in such a way as to reproduce as nearly as possible the conditions of actual practice in sighting and firing the gun at a real ship.

I will describe my invention by reference to the accompanying drawings, in which—

Figure 2:
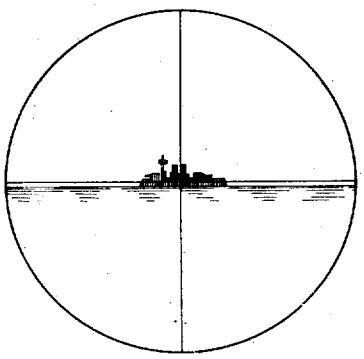

Figure 1 is a diagram illustrating my improved sighting-machine, while Fig. 2 shows the target as it would appear when seen through the sighting-tube provided with the cross-wires.

The sighting-tube $a$ having a lens at the eye end and cross-wires at the other end, is pivoted at $a^1$, as shown, in a standard or mounting $a^2$ which is not carried by the gun. The sighting-tube $a$ is connected, by means of lever mechanism $b$, $b^1$, $b^2$, with the trunnion of the gun to follow the movements of the gun. The sighting-tube is thus not directly attached to the gun, but is moved around a pivot of its own by a system of levers $b$, $b^1$, $b^2$, adapted to maintain a parallel relation between the tube $a$ and the gun. In other words, the sighting-tube $a$, as shown, is arranged to be moved just as the telescope-sights of guns in turrets are now moved. By adding my sighting-machine to the mechanism of the telescope-sight, I do not interfere with the operation of the latter in any way.

Immediately in front of the sighting-tube is a sheet of paper $c$, which may be held in a suitable frame $c^1$. On this paper is drawn a picture of a ship on the ocean, and this picture being near the focus of the lens will be plainly visible through the sighting-tube. An extension-frame $d$, fastened to the lever $b$, carries the electromagnetic marking device. This consists of a needle $e$, mounted behind the target $c$ and directly in line with the cross-wires of the sighting-tube, said needle being arranged to be actuated by an electromagnet $f$, so as to puncture the target-picture exactly at the point where the sighting-tube is aimed. The gun-captain by moving the gun can bring the sighting-tube to bear upon the desired point on the target picture, and then by closing the circuit the marking device will make a hole exactly on the spot where the cross-wires of the sighting-tube bear—that is, on that part of the target-picture where a shot from the gun would have gone in actual practice.

If the target be raised and lowered, the picture of the ship will rise and fall in the field of view of the sighting-tube, just as a real ship appears to do in the field of view of a telescope-sight when the ship carrying the telescope-sight rolls on the sea toward and from the object sighted at. To produce this movement, I mount the target-frame $C^1$ slidably in the framework *d* and arrange this frame to be moved up and down by a cam *g*, which may be rotated through the agency of a motor *h*, as shown. By making the curves on the periphery of the cam *g* of certain predetermined forms any kind of up-and-down motion with varying speeds can be imparted to the picture, and the appearance of a distant ship as seen through a telescope-sight on board a ship rolling in any kind of a seaway can be very closely simulated.

The gun-captain may practice sighting and firing with this apparatus just as he would actually sight and fire the gun at a distant object—that is to say, by moving the ordinary elevating lever of the gun (which is indicated diagrammatically at *i* in the drawings) the gun may be moved up and down in the endeavor to bring the cross-wires of the sighting-tube to bear at the desired point on the picture of the ship, and at the moment when a good aim is obtained the electric circuit 3 may be closed by the firing-pistol *k*. This will cause the needle *e* to puncture the target-picture, and so indicate the accuracy of the aim. The gunner thus practicing will perform the same operations and exert eactly the same skill as if he moved his gun up and down in the endeavor to put the cross-wires of his telescope-sight on a real ship and closed the electric circuit to fire his gun when a good aim is obtained. The target-marks, as above described, constitute a permanent record-sheet, which indicates the skill of the gunner.

One advantage of the invention above described is that, as heretofore mentioned, the gun-captain needs no assistance in manipulating the apparatus and can have his practice without inconveniencing any one else. Another advantage is that a perfectly fair comparison can be made between the records of two different men or of one man on different occasions. By having the target-pictures printed on record-sheets of standard dimensions the making of records becomes easy, convenient, and (which is more important) uniform.

Having thus described my invention, I claim:

1. In a sighting-machine for guns, the combination with a gun having a trunnion mounting, of a sighting-tube having a pivotal mounting in bearings independent of the gun, lever mechanism connecting said gun and tube for moving said tube with the gun and for maintaining said gun and tube in parallel relation to each other, a target-picture in front of said sighting-tube, means for imparting movement to said target-picture, means mounted near the end of said tube and movable therewith around the same center for marking said target at the point aimed at by the sighting tube.

2. In a sighting-machine for guns, the combination with a gun having a trunnion mounting, for a sighting-tube having a pivotal mounting in bearings independent of the gun, lever mechanism connecting said gun and tube for moving said tube with the gun and for maintaining said gun and tube in parallel or fixed angular relation to each other, a continuously-moving target-picture mounted directly opposite the front end of said sighting-tube, a marking device held in line with the tube behind said target-picture, and means for actuating said marking device.

3. In a sighting-machine for guns, the combination with a gun having a trunnion mounting, of a sighting-tube having a pivotal mounting in bearings independent of the gun, lever mechanism connecting said gun and tube for moving said tube with the gun and for maintaining said gun and tube in parallel relation to each other, an independently-movable target-picture mounted immediately in front of the sighting-tube, a supporting-arm moving with the tube around the same center, extending beyond the target-picture, an electromagnet having an armature arranged to actuate a needle mounted upon said supporting-arm, the needle being arranged to be actuated by said electromagnet to puncture the target-picture at the point aimed at by the sighting-tube, an electric circuit for actuating said magnet, and a device for closing the circuit, whereby the accuracy of the aim of the gun may be indicated upon the target.

4. In a sighting-machine for guns, the combination with a gun having a trunnion mounting, of a sighting-tube having a pivotal mounting in bearings independent of the gun, lever mechanism connecting said gun and tube for moving said tube with the gun and for maintaining said gun and tube in parallel relation to each other, a target-picture of a vessel, and a carrying-frame for said target-picture mounted to move immediately in front of said sighting tube, means for producing a movement of said picture, whereby said picture of the vessel when viewed through said sighting-tube has approximately the appearance of a vessel at sea, a marking device held in proximity to said picture and movable with said sighting-tube around the same center, and electrical means for actuating said marking device to mark said picture.

5. In a sighting-machine for guns, the combination with a gun having a trunnion mounting, of a sighting-tube having a pivotal mounting in bearings independent of the gun, lever mechanism connecting said gun and tube for moving said tube with the gun and for maintaining said gun and tube in parallel relation to each other, a continuously-moving target mounted directly opposite the front end of the sighting-tube, a supporting-arm moving with the sighting-tube around the same center, a marking device for said target carried by said arm, an electromagnet for operating said marking device to mark said target at the point aimed at by the sighting-tube, a circuit for said magnet, and means for controlling said circuit.

Signed at Panama, Panama, this 16th day of December, 1908.

BRADLEY A. FISKE.

Witnesses:
C. E. GUYANT,
MODESTO CAMPOS.